April 5, 1927.  
O. POULSEN  
SHAFT BEARING  
Filed July 14, 1922  
1,623,207
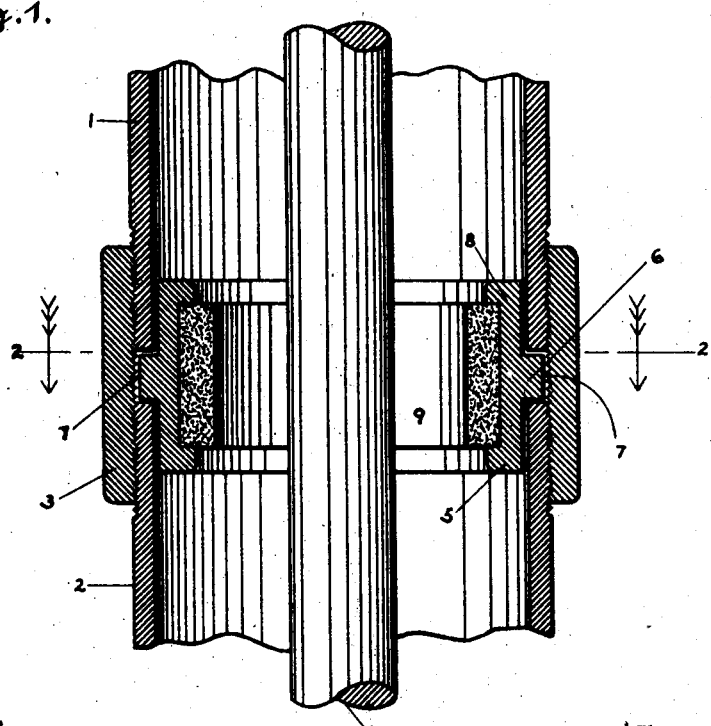
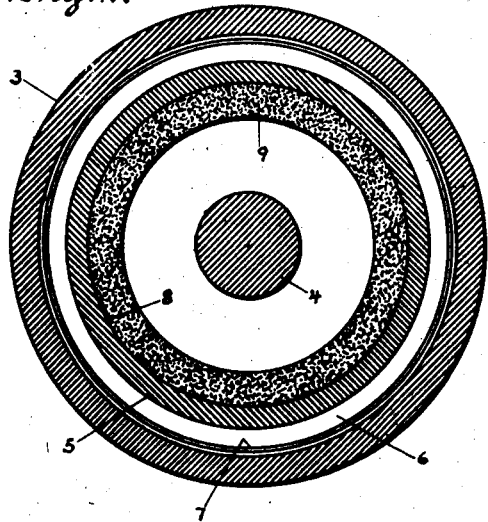
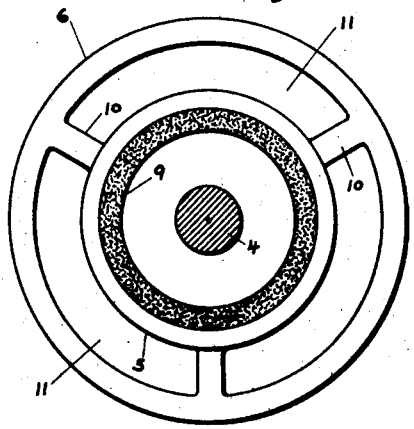
INVENTOR.  
Oscar Poulsen.  
BY  
A.S. Paré  
ATTORNEYS.

Patented Apr. 5, 1927.

1,623,207

UNITED STATES PATENT OFFICE.

OSCAR POULSEN, OF ALAMEDA, CALIFORNIA.

SHAFT BEARING.

Application filed July 14, 1922. Serial No. 575,047.

This invention relates to shock absorbers, or loose bearings for rotating shafts of pumps.

The invention may be best understood from the accompanying one sheet of drawing in which I have shown it applied to the vertical shaft of a deep well pump.

In the drawing:—

Figure 1 is a fragmentary vertical section of a discharge pipe surrounding the pump shaft and one of my bearings applied thereto.

Figure 2 is a cross-section on the line 2, 2, of Figure 1.

Figure 3 is a slightly modified form of the same.

In the figures—the discharge pipe, is formed of sections 1 and 2. These sections are connected by a coupling member 3. The two pipe sections may be spaced apart, as shown. The pump shaft 4 extends up in about the middle of the discharge pipe.

It is a well known fact that when a shaft is rotated with increasing speed, it will arrive at a speed at which it will start to vibrate quite violently, but as the speed continues to increase, said vibration will again cease and the shaft will again continue to run smooth. The speed at which this vibration takes place is commonly known as the critical speed.

A shaft revolving at a lesser speed than the critical speed must be properly supported by suitable bearings, but a shaft revolving at a speed greater than the critical speed will run in a true path and can be operated successfully with a minimum of support, especially when in a vertical position, in which position the center of gravity becomes the center of rotation.

In this invention I choose the higher speed, which however, can be obtained only by permitting the shaft to pass through the detrimental critical speed. It is to protect the machinery from damage or destruction when the shaft arrives at or passes through said critical speed that I provide a shock absorber, comprising a member 5, provided with a flange 6, adapted to enter the space 7, between the sections 1 and 2, and be supported and positioned thereby.

Secured within an inner depression 8, in the member 5 is a cushion 9 of suitable material, against which the shaft 4 may impinge, without injury.

In the modified form, shown in Figure 3, flange 6 is in the form of a spider, having arms 10 and water passages 11 therethrough.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit and scope of the appended claims at the end thereof.

Claims:

1. In combination with the discharge casing of a deep well pump and a rotating shaft therein, said casing being divided into sections spaced apart at their ends, a rubber cushion surrounding the inner side of said casing and adapted to prevent the whipping of said shaft, said cushion having a supporting member including an annular flange projecting from said member and secured between said sections, adapted to hold said cushion away from said shaft.

2. In combination with the discharge casing of a deep well pump and a shaft rotating within said discharge casing, said casing being divided into sections, a cushion surrounding the inner side of said casing and adapted to prevent the whipping of said shaft, means for holding said cushion away from said shaft, said means consisting of a member having a depressed portion upon its inner surface and an outwardly projecting annular flange secured between the ends of said sections.

In testimony that I claim the foregoing I have hereto set my hand this 15th day of September, 1921.

OSCAR POULSEN.